United States Patent [19]
Mohar

[11] Patent Number: 5,645,179
[45] Date of Patent: Jul. 8, 1997

[54] MULTIPLE IMPLEMENT EQUIPMENT BOOM

[76] Inventor: Donald A. Mohar, 1001 Mohar Rd., Grandview, Wash. 98188

[21] Appl. No.: 621,652

[22] Filed: Dec. 3, 1990

[51] Int. Cl.$^6$ .................................................. B66C 23/04
[52] U.S. Cl. ............................................................ 212/180
[58] Field of Search .................................. 212/175, 180, 212/177, 179, 238, 242, 244, 255, 261, 266, 267, 268

[56] References Cited

U.S. PATENT DOCUMENTS

| | | | |
|---|---|---|---|
| 2,568,959 | 9/1951 | Illies | 212/180 |
| 2,883,067 | 4/1959 | Davis | 212/180 |
| 4,034,875 | 7/1977 | Pugh et al. | 212/268 |
| 4,523,684 | 6/1985 | Baisden | 212/175 |

*Primary Examiner*—David M. Mitchell
*Assistant Examiner*—Stephen P. Avila
*Attorney, Agent, or Firm*—Stratton Ballew Richardson

[57] ABSTRACT

A multiple implement equipment boom which allows a plurality of working implements of different configurations to be used with a single vehicle is disclosed. The multiple implement equipment boom has a boom body with at least one telescoping shaft with a hollow outer beam and an inner beam slidably fit within the outer beam, and a connecting link with a receiving box that slidably fits over one end of the inner beam and a locking mechanism to secure the receiving box to the inner beam. The working implements can be exchanged by hand without tools and without removing the boom from the vehicle.

10 Claims, 5 Drawing Sheets

MULTIPLE IMPLEMENT EQUIPMENT BOOM

TECHNICAL FIELD

This invention relates to an equipment boom that is attachable to a vehicle and to a variety of working implements of different configurations, which implements can be changed without removing the boom from the vehicle to which it is attached.

BACKGROUND OF THE INVENTION

In certain fields, such as construction or agriculture, it is useful to be able to attach implements to vehicles such as trucks or tractors. As vehicles, implements, and their uses have evolved, operators have found that it is advantageous to be able to move the working implements relative to the vehicle both vertically and horizontally. It has also been found to be useful with certain implements to be able to use them on either the left or right side of a vehicle, or the front or rear of the vehicle. The placement of the implement can be a matter of absolute necessity for use, but can also be the personal preference of the operator. Being able to place an implement where the operator feels most comfortable enhances operational safety.

Since the same working implement is not always needed, and to prevent the requirement that there be one vehicle for each working implement, there have been attempts to allow different types of working implements to be used interchangeably on the same vehicle. Existing mechanisms that attach working implements to vehicles and that move the implements relative to the vehicles typically are attached permanently to those implements. Even if the implement Is not permanently attached to the mechanism, most existing designs require that the mechanism be removed from the vehicle in order to attach a different working implement.

Additionally, existing mechanisms for attaching and moving working implements usually are mechanically complex and subject to frequent breakdowns. The existing mechanisms often require unique connections to attach to a vehicle. Frequently, existing mechanisms also are relatively heavy, requiring any vehicle to which they are attached to have a substantial load-carrying capacity. The weight of existing mechanisms also makes their removal and attachment more difficult.

As illustrated by the above discussion, there are a number of desirable features for a multiple implement equipment boom. It would be desirable to have an equipment boom with which a variety of working implements could be used interchangeably. Also, it would be advantageous to have an equipment boom which allows working implements to be quickly and easily changed while the equipment boom is attached to a vehicle being used to do work. Further, it would be desirable to have an equipment boom that is mechanically simple and relatively lightweight. In addition, it would be desirable to have an equipment boom that is adjustable relative to a vehicle to which it is attached, both vertically and horizontally. It also would be desirable to have an equipment boom which allows implements to be used on the right or left side of a vehicle to which the equipment boom is attached. Similarly, it would be desirable to have an equipment boom which allows implements to be used on the front or the rear of a vehicle to which the equipment boom is attached. Additionally, it would be desirable to have an equipment boom that is attachable to a vehicle using an existing attachment mechanism.

While the discussion herein relates to a multiple implement equipment boom, it is not intended that the invention be limited to this situation. It is obvious from the description that follows that the present invention would be useful in other applications with problems common to those described herein.

DISCLOSURE OF THE INVENTION

It is an object of the present invention to provide an equipment boom which is attachable to a vehicle and a variety of working implements that can be used interchangeably.

It is also an object of the present invention to provide an equipment boom on which working implements can be exchanged without removing the equipment boom from a vehicle to which it is attached.

It is a further object of the present invention to provide an equipment boom that is mechanically simple to ensure reliability and ease of maintenance.

It is another object of the present invention to provide an equipment boom that can adjust the position of a working implement relative to a vehicle to which the boom is attached both vertically and horizontally.

It is yet another object of the present invention to provide an equipment boom which allows the use of working implements on the left or right side of a vehicle to which the boom is attached.

It is a further object of the present invention to provide an equipment boom which allows the use of working implements on the front or the rear of a vehicle to which the boom is attached.

It also is the object of the present invention to provide an equipment boom that is attachable to a vehicle with an existing attachment mechanism.

The present invention achieves these and other objectives which will become apparent from the description that follows, by providing a multiple implement equipment boom which has a body that can be attached to a vehicle and also has a connecting link that is attachable to both the body and a plurality of working implements of varying configurations.

In a preferred embodiment of the present invention, the equipment boom body has two telescoping shafts. Each telescoping shaft having an hollow outer beam and an elongated inner beam slidably fit within the corresponding hollow outer beam. The telescoping shafts are arranged so that they are substantially parallel to one another. The outer beams are connected together with spacers. The inner beams are connected together at one end with an end bracket. In this embodiment, a horizontal driver can be fixedly attached to the outer beams and to the end bracket which enables the horizontal driver to move both inner beams simultaneously relative to the outer beams.

The connecting link uses a receiving box. A receiving box is attached to each implement to be used with the equipment boom. In this embodiment, the receiving box uses two sections of hollow tubing. Each receiving box section has an interior cross section that is sufficiently large to allow the receiving box section to slidably fit over one of the inner beams. The receiving box sections are positioned next to and parallel to one another so that the inner beam ends can slidable fit within the receiving box.

Once the inner beam ends slide into the receiving box, a locking mechanism is used to secure the receiving box on the inner beams. In this embodiment, the locking mechanism can be a locking rod that passes through aligned holes in the receiving box and the inner beams. The locking rod then is secured with a pin.

While in the above embodiment two telescoping shafts are used, other preferred embodiments could use different configurations. For example, a single telescopic section also could be used. In this embodiment, the receiving box would consist of one section of hollow tubing with an internal cross section sufficiently large to enable it to slidably fit over the single inner beam.

Similarly, preferred embodiments can use telescoping shafts for the equipment boom body with a variety of cross-section shapes. For example, the equipment boom body using two telescoping shafts could use beams with square cross-sections. The telescoping shafts, whether used singularly or in pairs, also could use beams that have rectangular, circular or ovular cross sectional shapes.

In another alternative preferred embodiment, the horizontal driver consists of at least one hydraulic cylinder with one end mounted to the outer beams and another end attached to the end bracket at one end of the inner beams.

A further alternative preferred embodiment of the present invention has an equipment boom that can be attached to the front or rear of a tractor using an existing three point hitch commonly used in agricultural and construction applications. In other respects, this preferred embodiment is similar to the embodiments described above.

BEST MODE IN CARRYING OUT THE INVENTION

Figures 1, 1A, 1B:
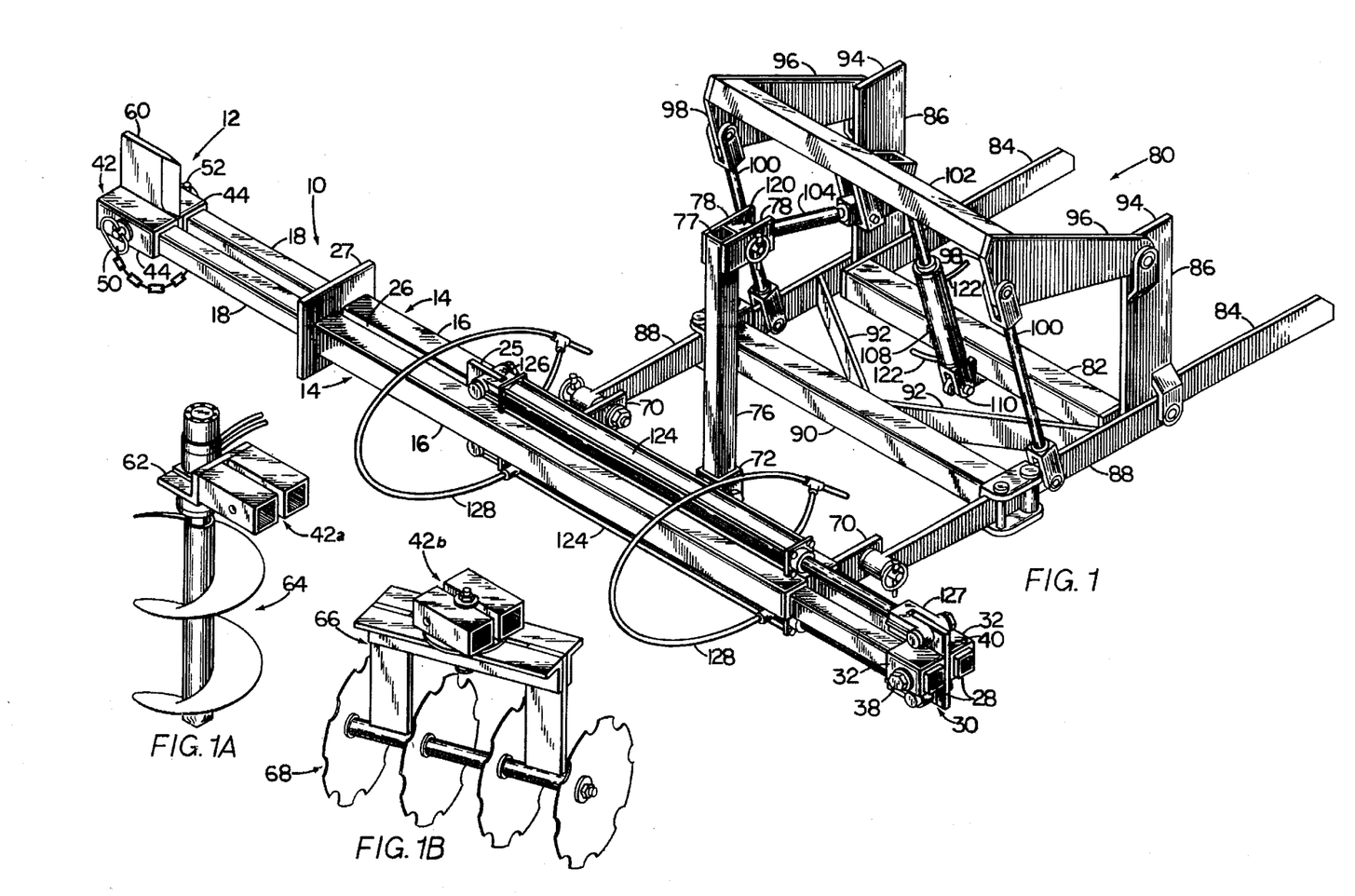
FIG. 1 is a front isometric view of a preferred embodiment constructed in accordance with the present invention.
FIG. 1A is a partial, front isometric view of an alternative preferred embodiment constructed in accordance with the present invention.
FIG. 1B is a partial front isometric view of an alternative preferred embodiment constructed in accordance with the present invention.

Illustrated in FIG. 1 is an equipment boom with a body 10 and a connecting link 12. The equipment boom body, which is shown in greater detail in FIG. 3, has two telescoping shafts 14. Each telescoping shaft has a hollow outer beam 16 and an inner beam 18 which slidably fits within the hollow outer beam. The inner beams are longer than the outer beams. The inner beams can be hollow or solid (not shown). Considerations of strength required by intended equipment uses versus added weight will dictate which type of inner beam is to be used.

Figure 3:
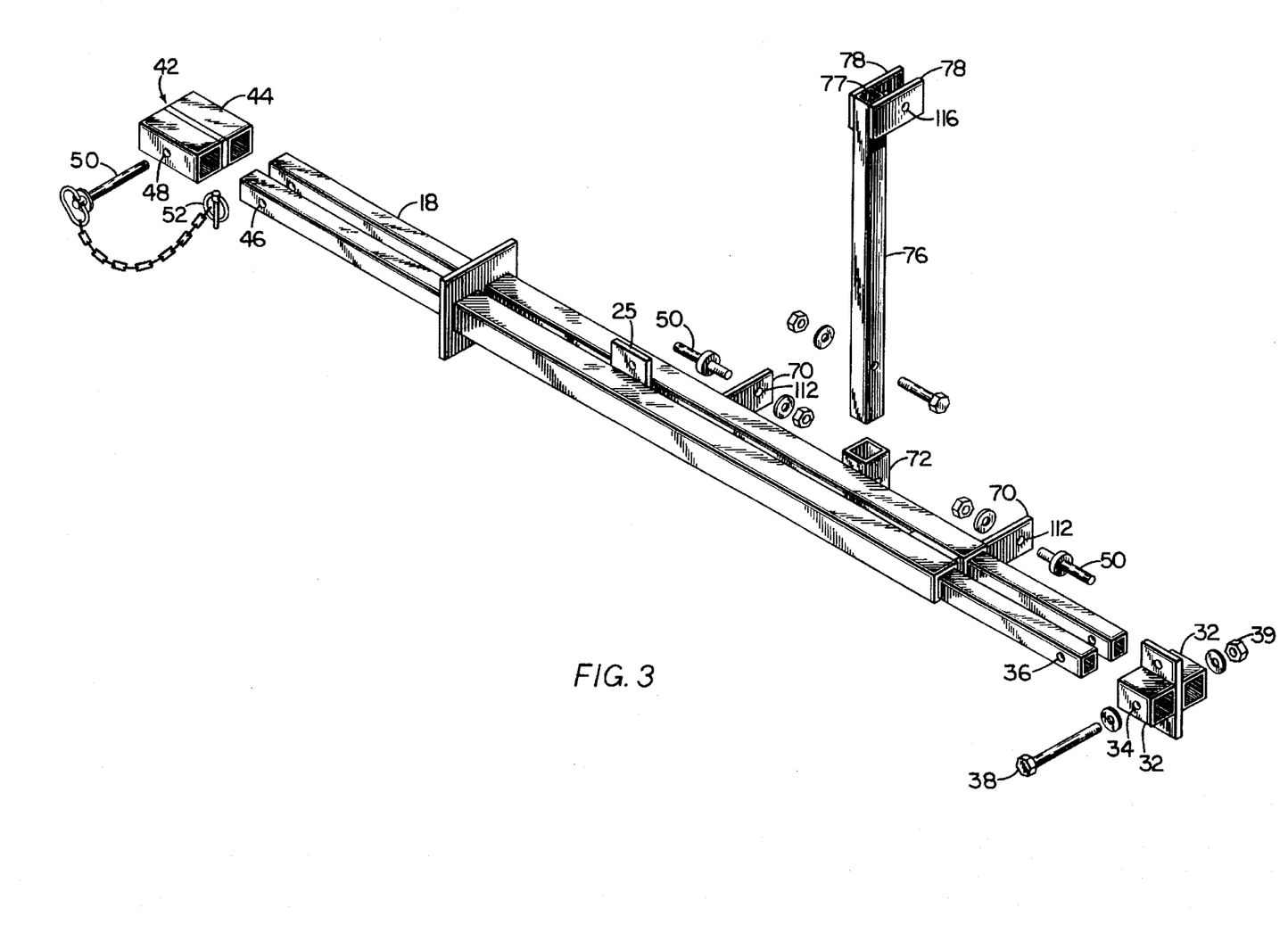
FIG. 3 is an exploded, partial front isometric view of a preferred embodiment constructed in accordance with the present invention.

The telescoping shafts are positioned and attached together so that they are parallel to one another and their ends are adjacent. When the equipment boom as presented in this embodiment is in use, the shafts are side by side in a horizontal plane. As shown in FIG. 3, the outer beams are attached to spacers 22 placed between their adjacent areas. Spacer brackets 25 also are used in the same manner with an additional upright that extends outwardly beyond the outer beams to provide an attachment point for other parts of the equipment boom.

Figure 4:
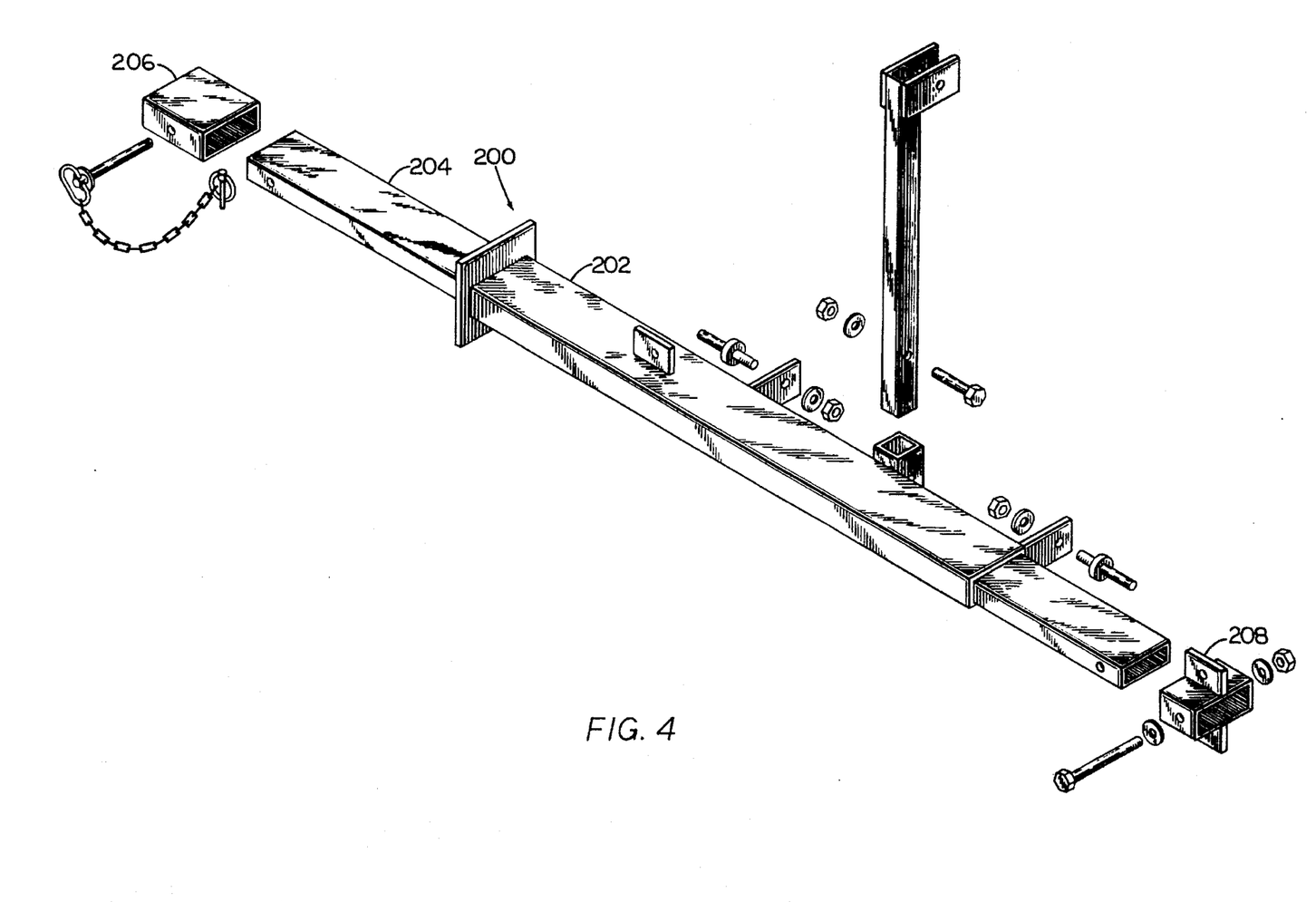
FIG. 4 is an exploded, partial front isometric view of an alternative preferred embodiment constructed in accordance with the present invention.

In this embodiment, the inner and outer beams all have substantially square cross sectional shapes. The attachments between the outer beams are made between adjacent sides 26. As shown in FIG. 4, the beams can also have a rectangular cross sectional shape. Other embodiments with beams having a variety of cross sectional shapes are contemplated. Practical considerations, such as ease of fabrication and ability of the inner beam to slide smoothly within the outer beam without excess twisting or binding, are the only limitations on the configuration of the beams.

Similarly, the choice of materials for the equipment boom is broad. While success has been had with common steel, any material that provides sufficient strength and allow fabrication of the necessary parts can be used.

An end plate 27 attached to one adjacent pair of the outer beam ends of the outer beams also strengthens the equipment boom body, as well as serve other purposes. The outer beams are attached to the spacers by welding. The outer beams can be attached together in number of other different ways well known to those skilled in agricultural and construction equipment design and manufacture.

Similar to the outer beams, the inner beams are positioned so that their ends 28 are adjacent. An end bracket 30 connects one adjacent pair of inner beams ends together, creating a connected pair and leaving an open pair of inner beam ends. The end bracket has a pair of hollow tubes 32 that have interior cross sections large enough, and are positioned adjacent and parallel to one another so that the end bracket slidably fits over the connected end pair. The end bracket is secured to connected end pair by aligning a plurality of aligned holes 34 in the end bracket and a plurality of aligned holes 36 in the inner beams proximate the connected end pair and passing a fastening bolt 38 through all the aligned holes. The fastening bolt then is secured with a nut 39. Extending outward from opposite sides of the end bracket are end bracket uprights 40.

The connecting link 12 includes a receiving box and locking mechanism. Receiving box 42 in this embodiment is constructed from two hollow tubes 44. As with the end bracket described above, the receiving box tubes each have interior cross sections large enough to slidably fit over the inner beams. Further, they are positioned adjacent and parallel to one another enabling the receiving box to slide over the open end pair of the inner beams.

Figure 2:
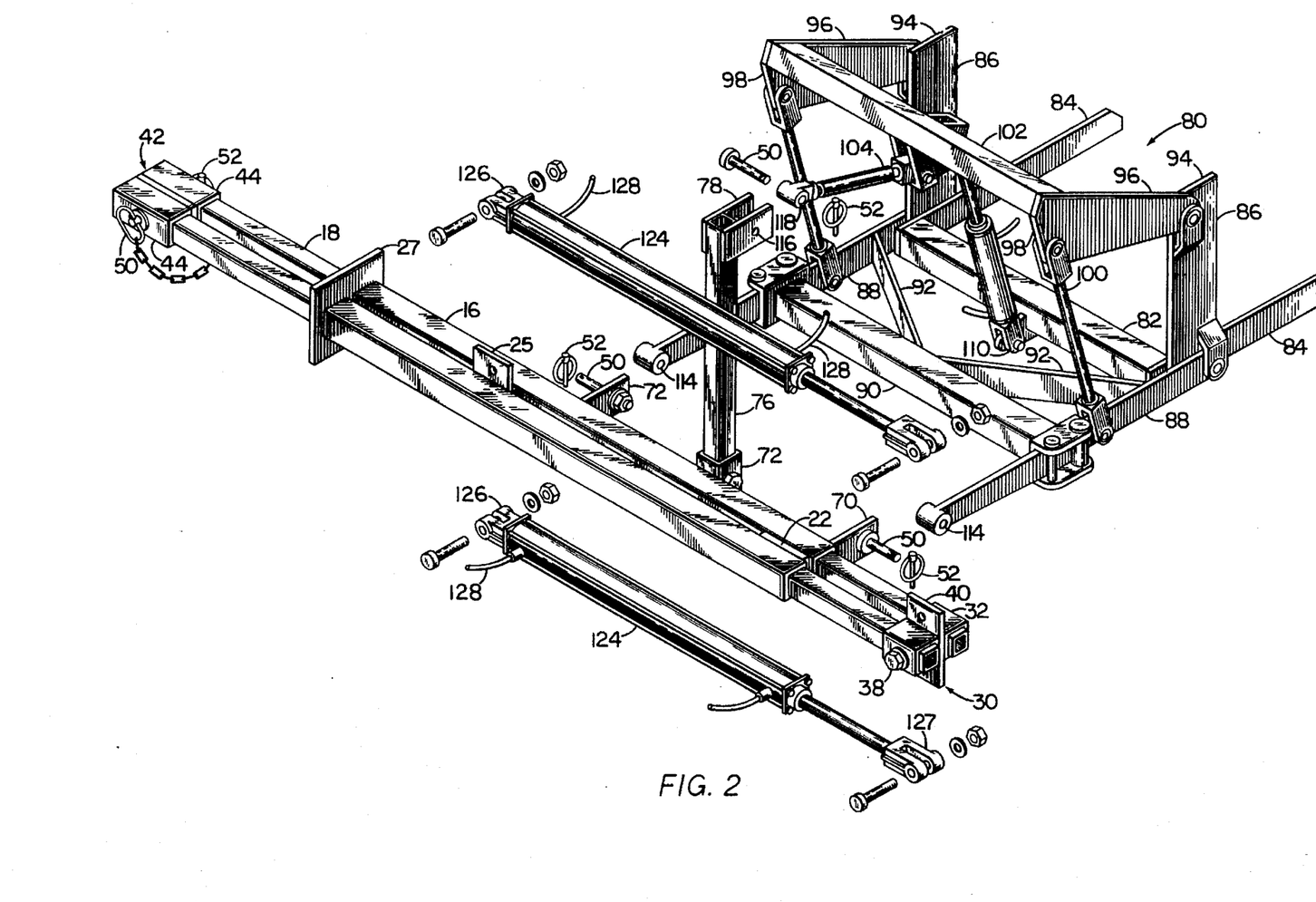
FIG. 2 is an exploded, front isometric view of a preferred embodiment constructed in accordance with the present invention.

The locking mechanism as shown in FIGS. 1 through 3, involves a plurality of aligned holes 46 in the inner beams proximate the open end pair, and similarly, a plurality of aligned holes 48 through the receiving box. When the open end pair slides into the receiving box, the open end pair holes and the receiving box holes are aligned and a locking rod 50 is placed through the holes in the receiving box and the open end pair. In turn, a quick release locking pin 52 is used to secure the locking rod in place.

This embodiment of the locking mechanism for the carrier length allows a quick, simple method of attaching working implements to the equipment boom. To remove a working implement, the locking pin is removed, the locking rod pulled from the holes in the receiving box and inner beams, and the receiving box slid from the open end pair. The operation can be accomplished in a matter of seconds. Fitting the next desired working implement can be accomplished just as quickly. It should be noted that the holes in the inner beams, the end bracket and the receiving box can be centered vertical so that they are vertically symmetrical and positioned upside down without difficulty or lose of function.

As illustrated in FIGS. 1 through 1B the receiving box portion of the carrier length can be attached to the working implements of widely differing configurations. FIG. 1 shows the receiving box being used with a wood splitting implement 60 which also doubles as the spacer element between the receiving box tubes that insures the proper spacing between the tubes for alignment with the inner beams. In FIG. 1A, a receiving box 42a has an L-shaped bracket 62 which enables a post hole digger 64 to be attached to the equipment boom body. FIG. 1B shows a receiving box 42b that is bolted to the top of a frame 66 that enables a disk implement 68 to be used with the equipment boom body. These implements are but a few of the different applications available using the present invention. Although the exact method of attachment of the receiving box to the implement changes in fact the flexibility of the connecting length in the present invention enables the use of virtually any construction or agricultural implement desired by an operator.

The equipment boom can be attached to different vehicles with a variety of different mounting systems, most of which are well know to those skilled in the art of agricultural and construction equipment design and manufacture. One type of attachment mechanism which can be used with this preferred embodiment is shown in FIGS. 1 and 2. On the equipment boom body, two attachment brackets 70 are affixed to one of the outer beams and which extend rearward from the beam. The attachment brackets also are substantially aligned with one another. Affixed to the same outer beam between the attachment brackets is a attachment socket 72. The attachment socket is formed from a short piece of hollow tubing, positioned so that it opens in an upwardly direction. Slidably fit within and fixedly attached to the attachment socket is a vertical support 76 which extends upward from the equipment boom body. The vertical support has an upper end 77 and has a pair of brackets 78 affixed on opposite sides of the vertical support proximate the upper end.

From the vehicle side there is an attachment frame 80 with a main brace 82 and two mounting arms 84 which are substantially parallel to the main brace. The mounting arms extend rearward from the main brace and are fixedly mounted to the frame of the vehicle (not shown) to which the boom is to be attached. Extending upwardly from and fixedly attached to each of the mounting arms proximate the main brace is a vertical frame member 86. Pivotally attached to each vertical frame member and extending forward from either side of the attachment frame is an attachment arm 88. A cross brace 90 with angular supports 92 fit between the attachment arms to provide additional strength.

Pivotally attached to and extending forward from the upper end 94 of each vertical frame members is an upper frame arm 96. Each upper frame arm is substantially aligned with the corresponding attachment arm. The forward end 98 of each upper frame arm is attached to the corresponding attachment arm by an auxiliary support 100 which is pivotally attached to both arms. An upper cross member 102 attaches the forward ends of the upper frame arms together and strengthens the upper frame arms.

The upper cross member also is serves as the pivotally attachment point for a lever arm 104. The rearward end 106 of the lever arm is pivotally connected to a vertical cylinder 108. The lower end 110 of the vertical cylinder is pivotally connected to the main brace.

To attach the equipment boom to the attachment mechanism, the attachment brackets are placed near the attachment arms and holes 112 in each of the attachment brackets aligned with holes 114 in the attachment arms. Similarly, holes 116 in the vertical support brackets are aligned with a hole 118 in the forward end 120 of the lever arm. When the corresponding holes are aligned, the same type of locking rod and quick release locking pin described above for the receiving box locking mechanism can be used to secure the attachment of the equipment boom to the attachment mechanism. Thus, the entire equipment boom can be removed in this embodiment by pulling three locking pins and locking rods.

In any of the above uses of the locking rod and locking pin, a standard nut and bolt can be substituted If quick removal and attachment of pieces of equipment is not important. Other attachment and locking mechanisms are well known to those skilled in the art and can be used with the present invention.

The equipment boom is moved vertically by activating the vertical cylinder. The vertical cylinder in this embodiment is a double action cylinder, which exerts force both in the contractiona and extension phase. In this embodiment, the cylinder is hydraulic and connected by lines 122 to the vehicle's hydraulic source (not shown). Other power sources, such as electric motor, could be used. When the vertical cylinder is contracted, the lever arm forward end raises, lifting the vertical support and thereby the equipment boom. Similarly, extending the vertical cylinder lowers the lever arm forward end and the equipment boom.

The open end pair and any attached working implement are moved horizontally by a horizontal driver. In this embodiment, a pair of hydraulic cylinders 124 are used as the horizontal driver. Each cylinder has a fixed end 126 attached to the spacer upright and a movable end attached to end bracket upright. As with the lifting cylinder, the horizontal driver cylinders are attached to the vehicle's hydraulic source by lines 128. Electric motors could also be used as the horizontal drivers. When the cylinders are contracted, the connected end pair are pulled toward the vehicle and the open end pair and any attached working implement pushed outward from the vehicle. To move a working implement closer to the vehicle, the cylinders are extended.

Figure 5:
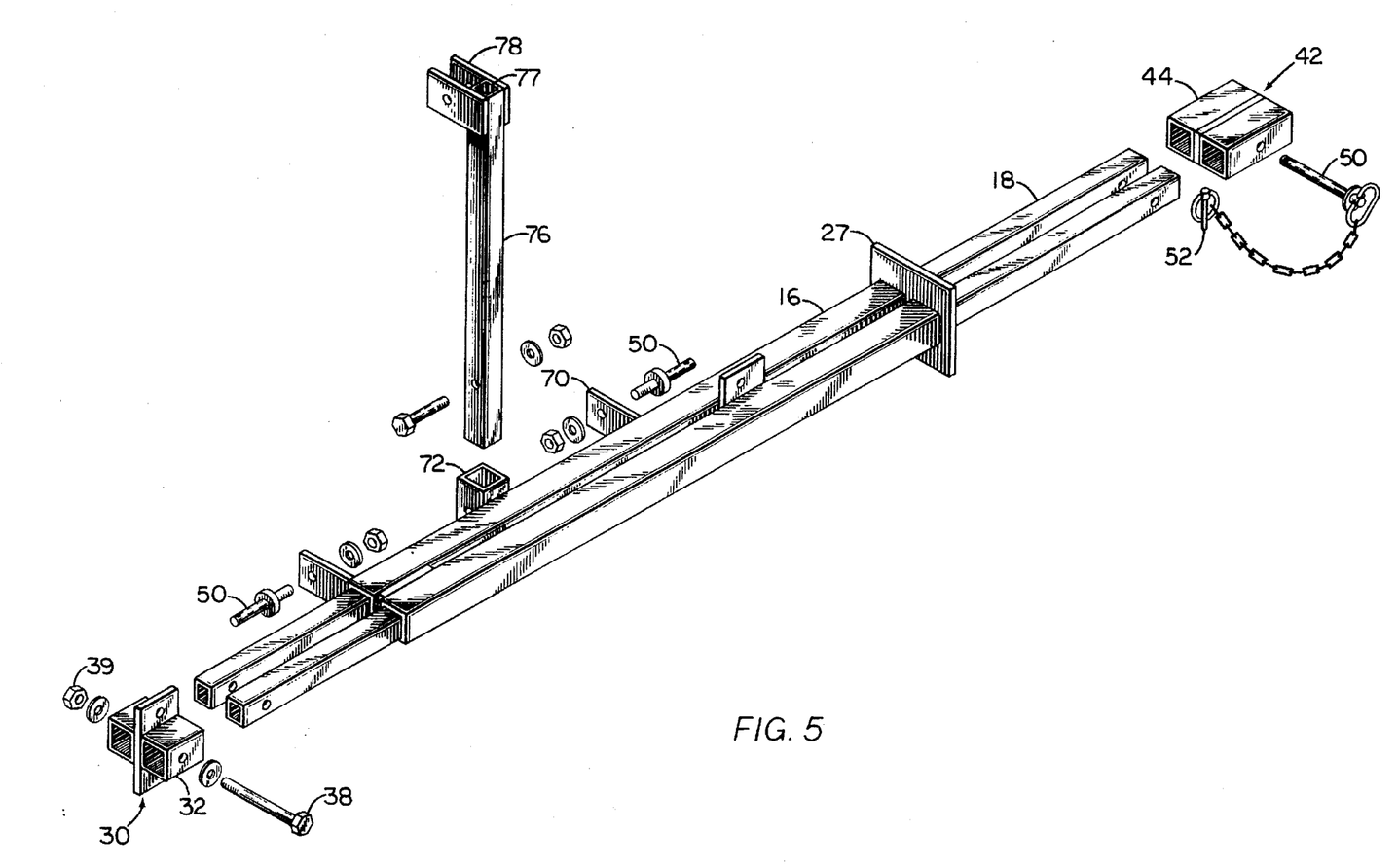
FIG. 5 is an exploded, partial front isometric view of an alternative preferred embodiment constructed in accordance with the present invention.

If a task requires that the working implements be changed from one side of a vehicle to the other, the locking rods holding at the attachment brackets and the upper end of the vertical support are removed and the vertical support removed from the attachment socket. The removal of the vertical support can be facilited by the use of locking rod and pin to affix the vertical support to the attachment socket. The equipment boom then can be turned upside down, the vertical support placed back within the attachment slot, and the boom reattached to the vehicle. Thus, it is possible to accomplish this by hand without the use of tools. The equipment boom shown in this reversed orientation is shown in FIG. 5.

As discussed briefly above and illustrated in FIG. 4, an alternative preferred embodiment of an equipment boom uses a single shaft 200 with an outer beam 202 and an inner beam 204 that have rectangular cross sectional shapes. The receiving box 206 and the end bracket 208, similarly, are made from single pieces of hollow, rectangular tubing. This embodiment functions in much the same way as the above described embodiments, including the implements that can be used and the manner of attachment to a vehicle.

The wood splitter shown in FIG. 1 is operated by placing a piece of wood between the splitting implement 60 and the end plate 27. The horizontal driver cylinders then are extended which pulls the splitting implement toward the end plate and splits the wood. The splitting implement can be used as shown with the wood being placed on the inner beams, or receiving box can be turned so that the splitting implement is beneath the inner beams and wood can be placed on the ground.

In FIG. 1A, the receiving box 42a has the L-shaped bracket 62 which enables the box to be locked on the equipment boom while keep the post hole digger 64 to be placed perpendicular to the ground as needed. The implement is powered by a hydraulically powered motor 65 that is connected to the vehicle hydraulic source by lines 65a. Other types of power could be used. When the post hole digger is in use, downward force is exerted by the boom.

In FIG. 1B, the receiving box 42b is attached to a frame 66 which, in turn, is attached to a disc implement 68. The receiving box is attache by a bolt 66a which allows the angle of the implement relative to the receiving box and equipment boom to be adjusted as desired.

The above application are only a few of the possibilities of the implements that can be used with this invention. Others uses and implements include a brush rake, a post driver and puller, a spray boom for liquids, a grape hiller and cultivator, a windrow turner, an air compressor mounted in place of one of the horizontal driver cylinders, a weed burner, a portable cement mixer, a mower, rototiller, a wire spooler, a rope tow, and a small crane for lifting.

An equipment boom constructed in accordance with the present invention allows a plurality of different working implements to be used with a single vehicle without requiring that the boom itself be changed. In addition, the connecting link not only allows the changing of implements but reduces it to a matter of minutes or even seconds. All of this is accomplished while also allowing operator flexibility as to the placement of any implements. The equipment boom is simple, relatively lightweight, and can be used with existing attachment mechanisms already found on tractors and truck.

INDUSTRIAL APPLICABILITY

The present invention is applicable in any situation where it is desirable to use a variety of different working implements with a single vehicle and to use the implements in different locations.

In compliance with the statute, the invention has been described in language more or less specific as to structural features. It is understood, however, that the invention Is not limited to the specific features shown, since the means and construction herein disclosed comprise preferred forms of putting the invention to effect. The invention, therefore, is claimed in any of its forms or modifications within the legitimate and valid scope of the claims that follow.

I claim:

1. A multiple implement equipment boom, said boom comprising:

a boom body, said boom body being attachable to a vehicle;

a connecting link, said connecting link connectable to said boom body and to a plurality of working implements of varying configurations;

at least one telescoping shaft, each said telescoping shaft having a hollow outer beam and an inner beam, each said inner beam being slidably fit within said corresponding outer beam and being longer than said corresponding outer beam;

at least one horizontal driver, each said horizontal driver attached to at least one said shaft so that said horizontal driver causes said inner beam to move relative to said outer beam;

a receiving box, said receiving box having at least one hollow tube, said tube fitting slidably over an end of said inner beam where there is one receiving box for each working implement to be used with said boom; and a locking mechanism, said locking mechanism securing said receiving box on said end of said inner beam.

2. The multiple implement equipment boom of claim 1 wherein said locking mechanism is operable by hand without requiring the use of tools.

3. The multiple implement equipment boom of claim 2, said boom further comprising:

an attachment mechanism, said attachment mechanism having attachment brackets extending from said boom body, said attachment brackets being substantially aligned with one another, and said attachment mechanism further comprising an attachment socket, said attachment socket also being attached to said boom body between said attachment brackets, said attachment brackets and said attachment sockets being oriented so that said equipment boom can be attached to a vehicle with said boom body extending laterally from said vehicle, and said attachment mechanism allowing, said equipment boom to be removed by using locking pins, and without the use of tools.

4. The multiple equipment boom of claim 1, said horizontal driver being a hydraulic cylinder with a fixed end attached to said outer beam and a movable end attached to an inner beam end not connected to said receiving box.

5. The multiple implement equipment boom of claim 4, said multiple implement equipment boom further comprising:

an attachment mechanism, said attachment mechanism having attachment brackets extending from said boom body, said attachment brackets being substantially aligned with one another, and said attachment mechanism further comprising an attachment socket, said attachment socket also being attached to said boom body between said attachment brackets, said attachment brackets and said attachment sockets being oriented so that said equipment boom can be attached to a vehicle with said boom body extending laterally from said vehicle, and said attachment mechanism allowing said equipment boom to be removed by using locking pins, and without the use of tools.

6. The multiple implement equipment boom of claim 5 wherein said attachment brackets and said attachment sockets are symmetrical with respect to said equipment boom so that said equipment boom can be extended laterally in either direction from said vehicle by pulling said pins and reversing the direction in which said equipment boom is oriented.

7. A multiple implement equipment boom, said boom comprising:

a boom body, said boom body being attachable to a vehicle and said boom body having two telescoping shafts, each said telescoping shaft having a hollow outer beam and an inner beam, said inner beams having ends and substantially equal lengths and said outer beams having open ends and substantially equal lengths less than said inner beam lengths, said inner beam further being slidably fit within said corresponding outer beam, and said outer beams further being parallel and adjacent to one another, and being connected together with said outer beams ends opening next to one another;

an end bracket, said end bracket connecting together two adjacent said inner beam ends, forming a connected end pair and leaving two adjacent said inner beam ends unconnected, forming an open end pair;

at least one horizontal driver, each said horizontal driver having a fixed end attached to said connected outer beams and a movable end attached to said end bracket, said horizontal driver moving said inner beams relative to said outer beams; and a connecting link, said connecting link having a receiving box, said receiving box having two hollow tubes, said tubes connected together and fitting slidably over said open end pair, and said connecting link further having a locking mechanism securing said receiving box on said open end pair where there is one receiving box for each working implement to be used with said boom.

8. A multiple implement equipment boom as claimed in claim 7, said locking mechanism having apertures through at least one end of each said inner beam and through said hollow tubes of said receiving box, said apertures being substantially aligned so that a locking pin may pass through said apertures in each said inner beam and said apertures in said hollow tubes simultaneously so that said locking mechanism can be operated by hand without requiring the use of tools.

9. The multiple implement equipment boom of claim 7, said multiple implement equipment boom further comprising:

an attachment mechanism, said attachment mechanism having attachment brackets extending from said boom body, said attachment brackets being substantially aligned with one another, and said attachment mechanism further comprising an attachment socket, said attachment socket also being attached to said boom body between said attachment brackets, said attachment brackets and said attachment sockets being oriented so that said equipment boom can be attached to a vehicle with said boom body extending laterally from said vehicle, and said attachment mechanism allowing said equipment boom to be removed by using locking pins, and without the use of tools.

10. The multiple implement equipment boom of claim 9 wherein said attachment brackets and said attachment sockets are symmetrical with respect to said equipment boom so that said equipment boom can be extended laterally in either direction from said vehicle by pulling said pins and reversing the direction in which said equipment boom is oriented.

* * * * *